United States Patent [19]

Matsushita et al.

[11] Patent Number: 4,814,833
[45] Date of Patent: Mar. 21, 1989

[54] DOCUMENT SIZE DETECTING DEVICE

[75] Inventors: Tetsuya Matsushita, Osaka; Kikunosuke Tsuji, Sakai; Akira Nakakuma, Takaishi; Kiyoshi Morimoto, Osaka; Hideaki Tsudaka, Neyagawa; Hiroshi Kobayashi, Kobe; Masuo Kawamoto, Daito, all of Japan

[73] Assignee: Mita Industrial Co., Ltd., Osaka, Japan

[21] Appl. No.: 122,099

[22] Filed: Nov. 17, 1987

[30] Foreign Application Priority Data

Feb. 26, 1987 [JP] Japan .................................. 62-43711
Apr. 28, 1987 [JP] Japan ............................. 62-65041[U]
Nov. 17, 1987 [JP] Japan .................................. 61-273743

[51] Int. Cl.$^4$ ............................................. G03B 27/62
[52] U.S. Cl. ........................................... 355/75; 355/8
[58] Field of Search ...................... 355/75, 3 R, 8, 11, 355/50, 51, 57

[56] References Cited

U.S. PATENT DOCUMENTS 4,541,713  9/1985  Maekawa .............................. 355/75
4,620,781 11/1986  Miyamoto ........................... 355/3 R
4,692,019  9/1987  Morimoto et al. ..................... 355/8

Primary Examiner—Richard A. Wintercorn
Attorney, Agent, or Firm—Beveridge, DeGrandi & Weilacher

[57] ABSTRACT

A document size detecting device with the arm which folds by interlocking with the reciprocating motion of the optical system of the image forming apparatus and extends and contracts by interlocking with the reciprocating motion of the optical system. The optical sensor for detection of the document size is installed at a prescribed position of the arm and the feeder line for the light source is held. Therefore, the special mechanism for holding the feeder line is not necessary and it is possible to achieve simplified construction of the image forming apparatus. Also, because the feeder line is caused to curve along the outside of the arm at the rotating section thereof, it is possible to provide a large radius of the bent portion of the feeder line, there will be no considerably concentrated stress which is locally applied to the feeder line, therefore the life of the feeder line can be extended.

20 Claims, 19 Drawing Sheets

DOCUMENT SIZE DETECTING DEVICE

BACKGROUND OF THE INVENTION

The invention relates to a document size detecting device, and more particularly, to a document size detecting device which is capable of automatically detecting the size of an original document set on a transparent plate.

In recent years, a number of image forming device such as an electrophotographic copying apparatus employs a constitution wherein an original document set on a transparent plate is exposed to form an image corresponding to that of the original document by moving an optical system. In an electrophotographic copying apparatuses in particular among image forming apparatuses such as above, there is provided an electrophotographic copying apparatus comprising a document size detecting function for automatic detection of the size of an original document set on a transparent plate, an automatic paper selecting function for automatic feeding from a paper cassette the paper of a size that conforms to the copying magnification set based on the detected document size, and an automatic copying magnification setting function which automatically calculates the copying magnification from the detected document size and the paper size to cause to accomplish variable power of an optical system.

Conventionally, there has been provided a document size detecting device used for the type of an electrophotographic copying apparatus such as above wherein;

(A) a sensor bar having a sensor at the tip thereof is caused to interlock with a motion to close a document presser and further caused to swivel in parallel with a transparent plate thereby to automatically detect the size of an original document in the bases on a document-detecting time (Unexamined Japanese Utility Model Publication No. 201558/1982).

(B) a coloring member provided at a prescribed position of a document presser, a photo emitter which irradiates light on the coloring member, a photo receptor which receives the reflecting light from the coloring member, and a driving means for retracting the foregoing photo emitter to a position to allow free movement of an optical system, so that the document size is automatically detected in accordance with the signal from the photo receptor which corresponds to a portion interrupted by an original document and a portion not interrupted by the original document (Unexamined Japanese Patent Publication No. 22424/1981).

(C) a pair of optical sensors installed at a prescribed position of the moving frame which supports an optical element, one of the foregoing optical sensors detects the end of the original document and the other optical sensor of the foregoing reads the mark of an indication plate thereby detecting the document size automatically (Unexamined Japanese Patent Publication No. 48759/1982).

(D) one end of the foregoing arm is connected to the prescribed position of the body of an image forming apparatus, and other end of the arm is connected to prescribed position of the moving frame which supports the optical element, so as to cause an arm capable of folding at a prescribed part to extend and contract by interlocking the arm with the movement of the optical system and a plurality of optical sensors are installed on the top surface of the foregoing arm corresponding to an original document of various fixed forms (Japanese Patent Application No. 148780/1985, US Patent Application No. 880,859, European Patent Application No. 86109130.4).

The document size detecting device described in (A) of above has a problem wherein when the speed to close the original document presser is changed, the document size is detected accidentally because the document detecting time is changed pursuant to a change in the speed to close the original document presser.

Further, the document size detecting device of (B) of above has a construction which becomes complicated because the device requires a special driving mechanism to shunt the photo receptor. Besides, because the time to shunt the photo receptor is necessary between a point where the size detection of an original document is completed and a point where the exposure of the original document is started, there was a problem that it took a long time from a point where the key operation was accomplished to start exposure of the original document to a point where the exposure of the original document was completed.

Furthermore, the document size detecting device of (C) of above involved a problem in which because it was necessary to reciprocate once the moving frame which supports the optical element each time the size of the original document is detected, it took a long time after the key operation was accomplished to start exposure of the original document and before the exposure of the original document was completed.

For the purpose of eliminating the above problems, the applicants of the present invention developed a document size detecting device having a constitution as described in (D) of above, wherein no special driving means for shunting is necessary and it is possible to reduce the time from a point where the prescribed key operation is accomplished to a point where the exposure of the original document is completed. More particularly, this document size detecting device comprises an arm which is foldable at a prescribed portion, one end of the arm is connected to a prescribed position of the body of the electrophotographic copying apparatus, the other end thereof is connected to a prescribed position of the moving frame which supports the optical element so as to extend and contract following the movement of the moving frame, a plurality of optical sensors are installed at mutually different prescribed positions of the foregoing arms, and the output signal from the optical sensor is caused to be led as it is to the control section installed inside a device such as an electrophotographic copying apparatus thereby accomplishing the detection of the document size based on the output signals from optical sensors.

By the above arrangement, when the moving frame which supports the optical element is located at the home position, it is possible to dispose the optical sensor caused to correspond to original documents of various fixed forms by extending the arm. Therefore, by determining a specific optical sensor which has detected an original document, it becomes possible to automatically detect the size of the original document Moreover, after the document size is detected, exposure of the original document can be accomplished without any inconvenience because the arm is foldable following the movement of the moving frame.

However, in an electrophotographic copying apparatus of optical system moving type as described in (D) of above, it is necessary to provide the feeder line to supply the electric power to the light source for illuminating the original document with such number of degrees of freedom as to allow the feeder line to follow the movement of the optical system but if this feeder line is caused to hang, the feeder line touches the parts installed in the area around the feeder line causing subsequent wear or is hooked on the foregoing parts thereby hindering the movement of the optical system.

For the reasons of above, in a conventional electrophotographic copying apparatus, there used to be a problem wherein it is necessary to provide a additional mechanism to hold the feeder line freely movable (refer to Unexamined Japanese Patent Publication No. 98429/1985 for example, in which a flexible coil spring is used instead of the arm and the feeder line is passed through coil spring), thus the mechanisms of the electrophotographic copying apparatus become complicated and an additional space is required inside the electrophotographic copying apparatus.

On the other hand, because the arm is folded frequently, the durability of the feeder line at the folding section of the arm becomes a problem. For example, in Unexamined Japanese Utility Model Publication No. 2323/1987, the feeder line is installed at the end of the arm on the side where the arm is connected to the moving frame of the optical system, along the side of the inside where the connecting support shaft is folded. Therefore, the radius of the bend or curve of the feeder line becomes small while it is folding, a considerably large concentrated stress is locally applied to that part of small radius when the arm extends and contracts following the movement of the optical system, thereby making it easy for the feeder line to be broken and making it difficult to replace once the feeder line is broken.

SUMMARY OF THE INVENTION

An object of the present invention is to provide a document size detecting device, which is not influenced by the speed to close the original document presser, capable of reducing the time from a point where the prescribed key operation is accomplished to a point where the exposure of an original document is completed, and is also capable of eliminating a special mechanism used to hold the feeder line for the light source.

Another object of the present invention is to provide a document size detecting device, which is not influenced by the speed to close the original document presser, capable of reducing the time from a point where the prescribed key operation is accomplished to a point where the exposure of an original document is completed, and can also be installed so that the radius of the bend of the feeder line is not reduced even if the arm is caused to fold thereby making it difficult for the feeder line to be broken.

In order to accomplish the objects of above, the document size detecting device according to the present invention is installed in an image forming apparatus of optical system moving type for scanning and exposing an original document by reciprocating an optical system, an arm which is foldable at least at one location is provided, one end of the foregoing arm is rotatably connected to the prescribed position of the body of the image forming apparatus, the other end of the arm is also rotatably connected to the prescribed position of the moving frame which supports the optical elements, so that it can be extended and contracted by interlocking it with the movement of the optical system , one or more optical sensor is installed. on the top surface of the arm, and the feeder line for supplying power to a light source provided on the optical system to illuminate the original document is installed along the arm.

In the document size detecting device of the construction such as above, it is possible to cause the arm almost to extend and to dispose the optical sensor corresponding to the original document of various fixed forms when the moving frame is located at the home position. Therefore, by determining a specific optical sensor which has detected the original document, it is possible to automatically detect the size of an original document. And, after the size of an original document is detected, the original document can be exposed without any inconvenience because the arm is folded following the movement of the moving frame.

Furthermore, because the feeder line for light source is installed along the arm, it is not necessary to provide an additional mechanism for holding the feeder line.

And, the above optical sensor can be a reflecting type sensor and installed on the arm so that the irradiated light is directed diagonally upward. In such a case, accurate document size detection can be accomplished without being affected by the reflected light from the transparent plate.

In order to accomplish another object of the above, the document size detecting device of the present invention is installed on an image forming apparatus of optical system moving type for scanning and exposing an original document by reciprocating the optical system, an arm which is foldable at least at an intermediate section is provided so that it can be extended and contracted by interlocking it with the movement of the optical system, one end of the foregoing arm is rotatably connected to the prescribed position of the body of the image forming apparatus, the other end of the arm is also rotatably connected to the prescribed position of the moving frame which supports the optical elements, a plurality of optical sensors are installed on the top surface of the arm, the feeder line for supplying power to a light source the arm, and the foregoing feeder line is caused to bend over the outside of the arm at respective rotating sections except for the one end of the arm which is connected to the body of the image forming apparatus.

According to the construction such as above, because the arm is freely foldably constructed about each rotating section, the arm performs extension and contraction following the optical system as it moves. In this process, because the feeder line is caused to bend over the outside of the arm at each rotating section except for the one end of the arm which is connected to the body of the image forming apparatus, it is possible to provide a large radius of the bend of the feeder line and to prevent a considerably large concentrated stress from being locally applied to the feeder line.

The features of above according to the present invention will further be apparent by the following descriptions with reference to the attached drawings.

DETAILED DESCRIPTION OF THE EMBODIMENTS

Figure 1:
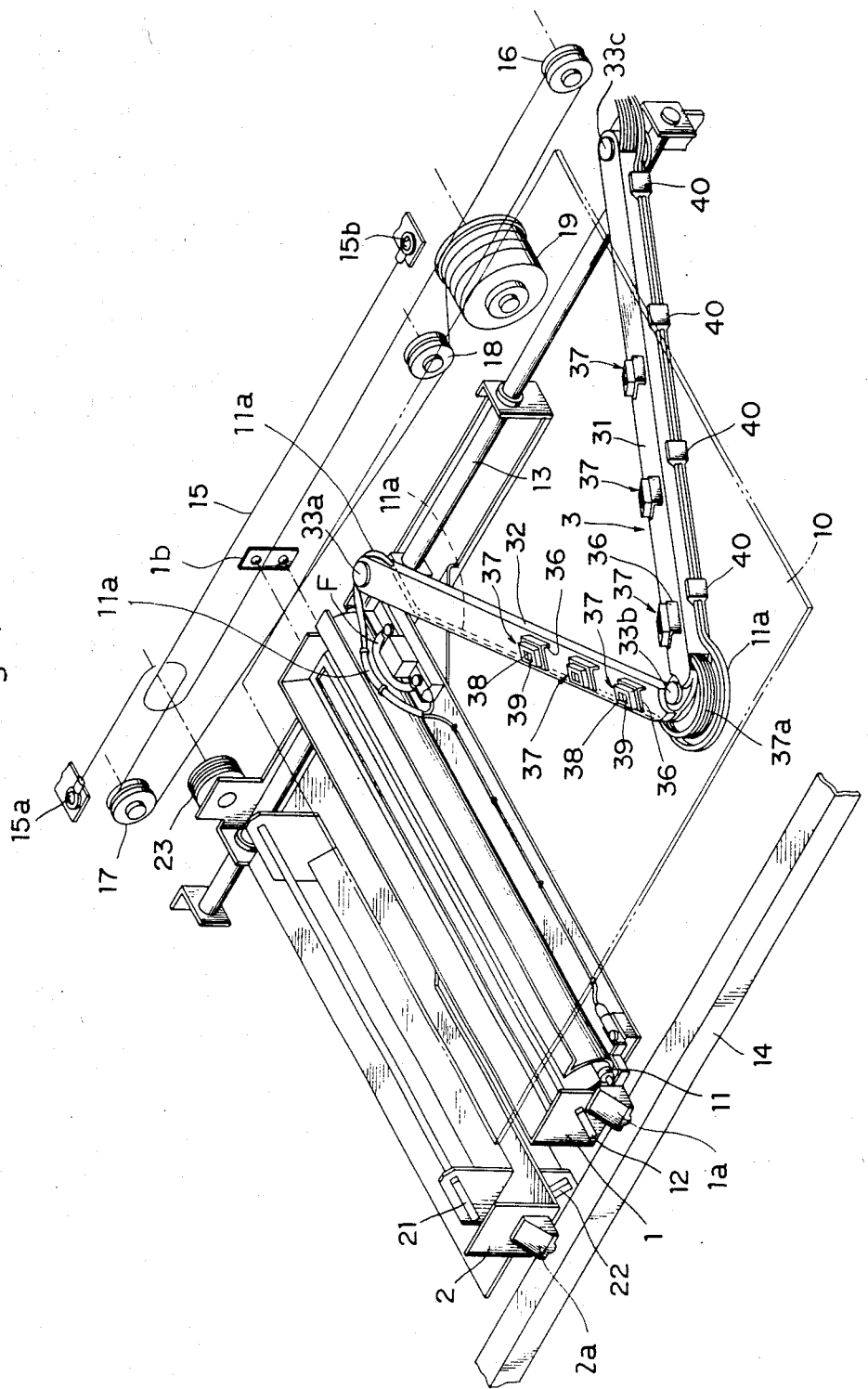
FIG. 1 is a perspective diagram illustrating an embodiment of a document size detecting device according to the present invention.

FIG. 1 is a perspective diagram illustrating essential parts of an electrophotographic copying apparatus which is equipped with a document detecting device of the present invention, comprising under a transparent plate 10 for setting an original document thereon, a first moving frame 1 which support a light source 11 and a reflecting mirror 12, a second moving frame 2 which supports reflecting mirrors 21 and 22, and a freely foldable arm 3.

One end of the foregoing two moving frames 1 and 2 is slidably engaged with a guide shaft 13, and the other end of the moving frame is placed on a guide rail 14 disposed in parallel with the foregoing guide shaft 13 by means of sliding parts 1a and 2a respectively. In other words, the two moving frames 1 and 2 are reciprocatingly provided along the guide shaft 13 and the guide rail 14.

Both ends 15a and 15b of the wire 15 are fixed to the body of the electrophotographic copying apparatus and are further wound round a guide pully 16 and 17, tension pully 18 and driving drum 19, and round a driven pully 23 installed at the end of the second moving frame 2, and further are sandwiched between the end of the first moving frame 1 and the mounting member 1b. Therefore, optical elements of the light source 11 and reflecting mirrors 12, 21 and 22 are caused to move reciprocatingly in accordance with the rotation of the driving drum 19. Incidentally, when the foregoing two moving frames 1 and 2 are moving, the moving speed of the first moving frame 1 is two times the moving speed of the second moving frame 2.

The arm 3 rotatably connects a pair of rods 31 and 32 each other having a channel cross section whose lower surface is laid open to almost the full length thereof, by means of a supporting shaft 33b, so that the arm 3 can be folded at the center thereof. And, one tip of the rod 31 is connected rotatably to the prescribed portion of the body of the electrophotographic copying apparatus by means of a supporting shaft 33c, close to the end of the guide shaft 13 for example, and the other tip of the rod 32 is rotatably connected to the prescribed portion of the first moving frame 1 by means of a supporting shaft 33a. And, at the prescribed position on the top surface of the foregoing pair of rods 31 and 32 are installed a plurality of optical sensors 37 comprising photo emitters 38 such as LEDs and photo receptors 39 such as photo transistors. The photo emitter 38 and the photo receptor 39 are installed integrally and mutually close to each other on the mounting member 36. Besides, the mounting member 36 is installed in a direction diagonally upward. The two rods 31 and 32 are formed with cavities inside thereof and the lead wire 37a connected to each optical sensor 37 is wired through the foregoing cavities. By providing cavities in such manner as above, reduction in weight of the arm 3 can be accomplished also.

Figure 3:
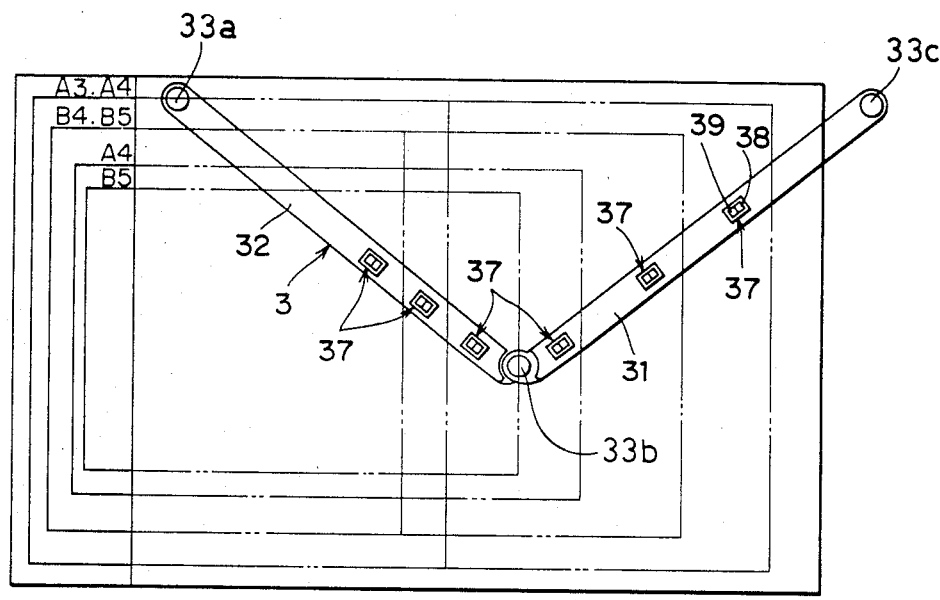
FIG. 3 is a plan view illustrating a position to install an optical sensor.

As shown in FIG. 3, each optical sensor 37 is provided corresponding to set positions of the original documents of various fixed forms (for example, original documents of A3, B4, A4, and B5). That is to say, with the first moving frame 1 being placed at the home position, the optical sensor 37 which detects the original document of the minimum size among the plurality of optical sensors 37 is provided at a position where the light can be irradiated to the original document of the minimum size, and other optical sensors 37 are also provided at positions within the range of respective original documents corresponding to the size of the fixed form so that the light can be irradiated to the area outside the original document which is one size smaller than the original document of the size of that fixed form.

Figure 7:
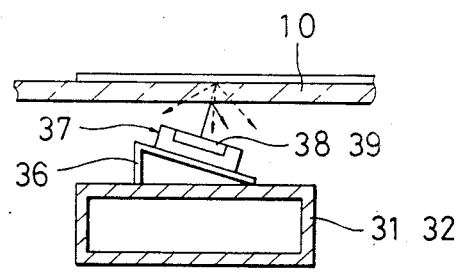
FIG. 7 is a sectional view of essential parts to describe detecting action of the optical sensor.

As a schematic diagram is shown in FIG. 7, the foregoing optical sensor 37 is caused to be disposed close to the lower surface of the transparent plate 10 by means of the mounting member 36 and is installed so that the whole of the optical sensor 37 is caused to direct diagonally upward. Therefore, the light directly reflected from the lower face of the transparent plate 10 will not go directly into the photo receptor 39 but only the light scattered from the original document (the light shown in broken lines in FIG. 7) enters the photo receptor 39. In the manner as stated above, by causing the scattering light from the original document set on the transparent plate 10 to be received by the photo receptor 39, it becomes possible to detect the presence of original documents. Furthermore, because each optical sensor 37 is installed closely under the lower surface of the transparent plate 10, the illumination intensity of the light irradiated to the original document can be sufficiently secured without narrowing the directivity of the photo emitter 38 or increasing the intensity of irradiation. Therefore, the document size detecting device of the present invention has an advantage to reduce the price of the optical sensor 37.

Filters may be installed on the light transmitting windows of the photo emitter 38 and/or photo receptor 39 as may be required. For example, when using a photo emitter 38 which irradiates infrared rays, it is possible to eliminate the influence of the external light by installing visible light rejecting filters.

Referring to FIG. 1, the symbol 11a denotes a feeder line which supplies a power to the light source 11 from a power unit provided with the electrophotographic copying apparatus (not shown in the diagram). This feeder line 11a is laid along one side of the arm 3 and freely foldably wired at the prescribed portion. To describe more particularly, the feeder line 11a connected to the light source 11 by means of the temperature fuse F is wound round a side of the supporting shaft 33a (the side shown by the symbol B in FIG. 2) which is opposite to the side where the first moving frame 1 and the rod 32 face each other, with a necessary allowance in length required for the rod 32 to fold freely.

Figure 8:
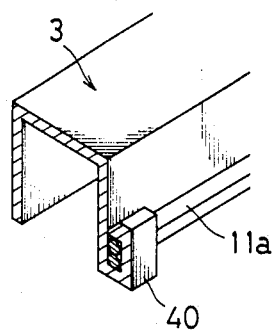
FIG. 8 is a partially cutaway perspective diagram of an arm.

Furthermore, the feeder line 11a is wired toward the side where the first moving frame 1 and the rod 32 face each other (the side shown by the symbol A in FIG. 2), being hooked on a plurality of hooks 40 formed on the rod 32, and further led to the bend (the portion where the supporting shaft 33b is disposed) along the outside of the rod 32 (refer to FIG. 8). By hooking the feeder line on the hooks 40 in such a manner as above, the special space for wiring the feeder line 11a along the rods 31 and 32 is eliminated.

At the bend of the arm, the feeder line 11a is provided with an allowance in length necessary for the rods 31 and 32 to fold around the supporting shaft 33b, at the opposite side where the rods 31 and 32 face each other (the side shown by the symbol D in FIG. 2) and is caused to curve almost in loops of slightly large diameters.

Thereafter, the feeder line 11a is wired along the outside of the rod 31 to be led to the end thereof (the portion where the supporting shaft 33c is disposed) and is further led to the power unit (not shown) by means of a connector (not sown).

Figure 2:
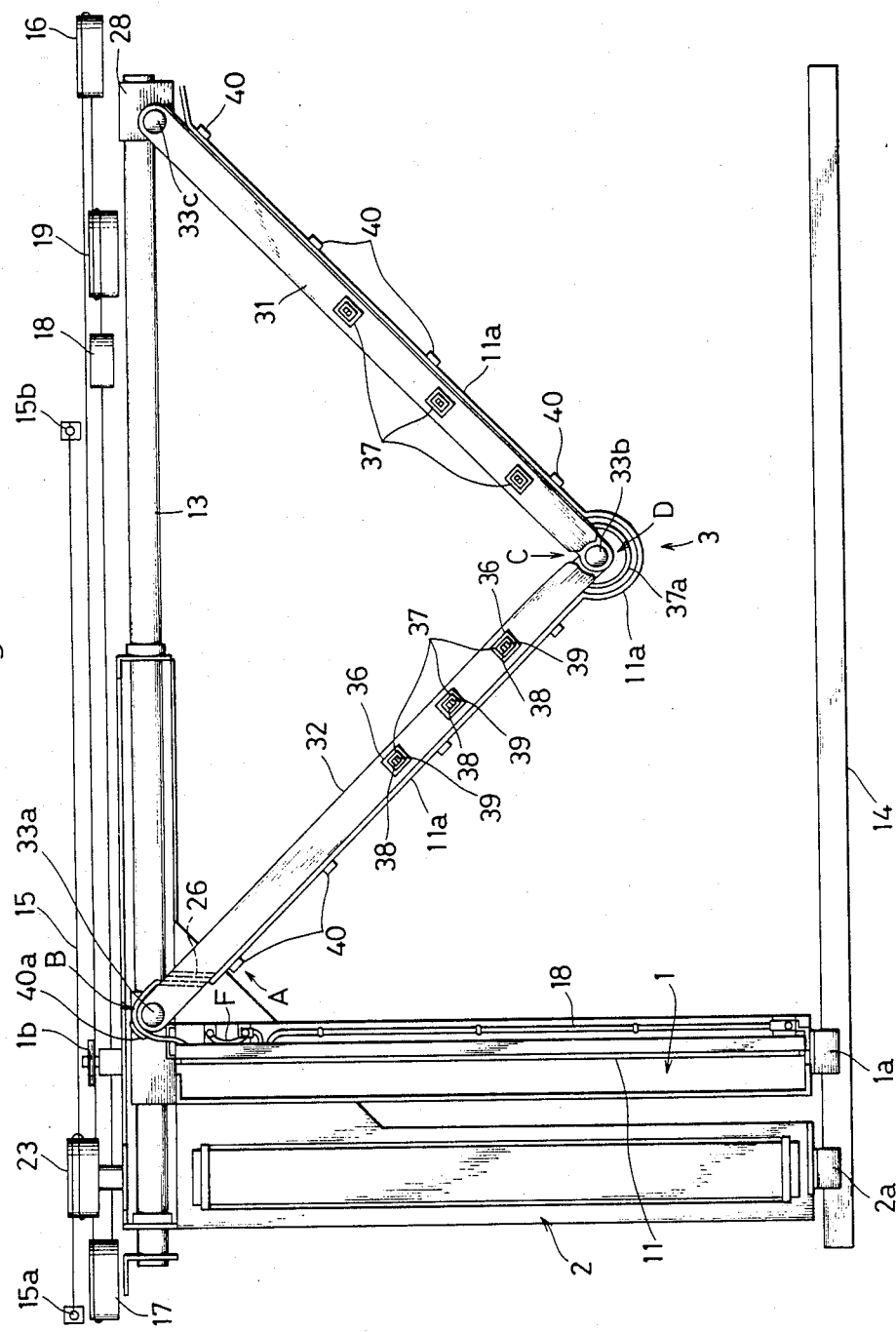
FIG. 2 is a plan view illustrating a moving frame being at its home position.
Figure 6:
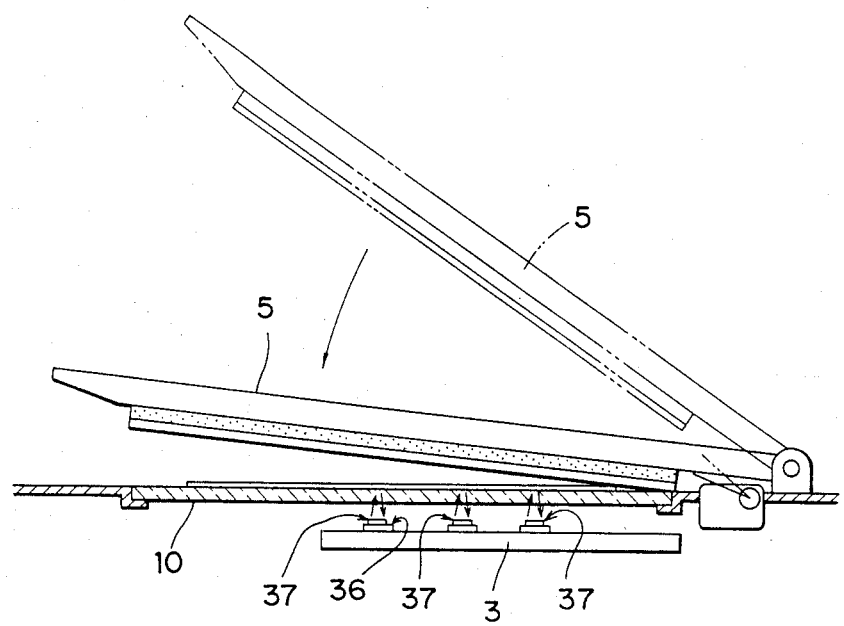
FIG. 6 is an approximate sectional view illustrating a function for detection by the optical sensor.

Detecting operations of the document size detecting device of the above construction will be described. As shown in FIG. 1 and FIG. 2, wherein the first moving frame 1 is located at the home position, the original document presser 5 is closed as shown in FIG. 6. The optical sensor 37 is caused to actuate while the original document presser 5 is being closed. In this case, the document size can be detected by a specific optical sensor 37 which has received the reflected light from the original document.

Figure 4:
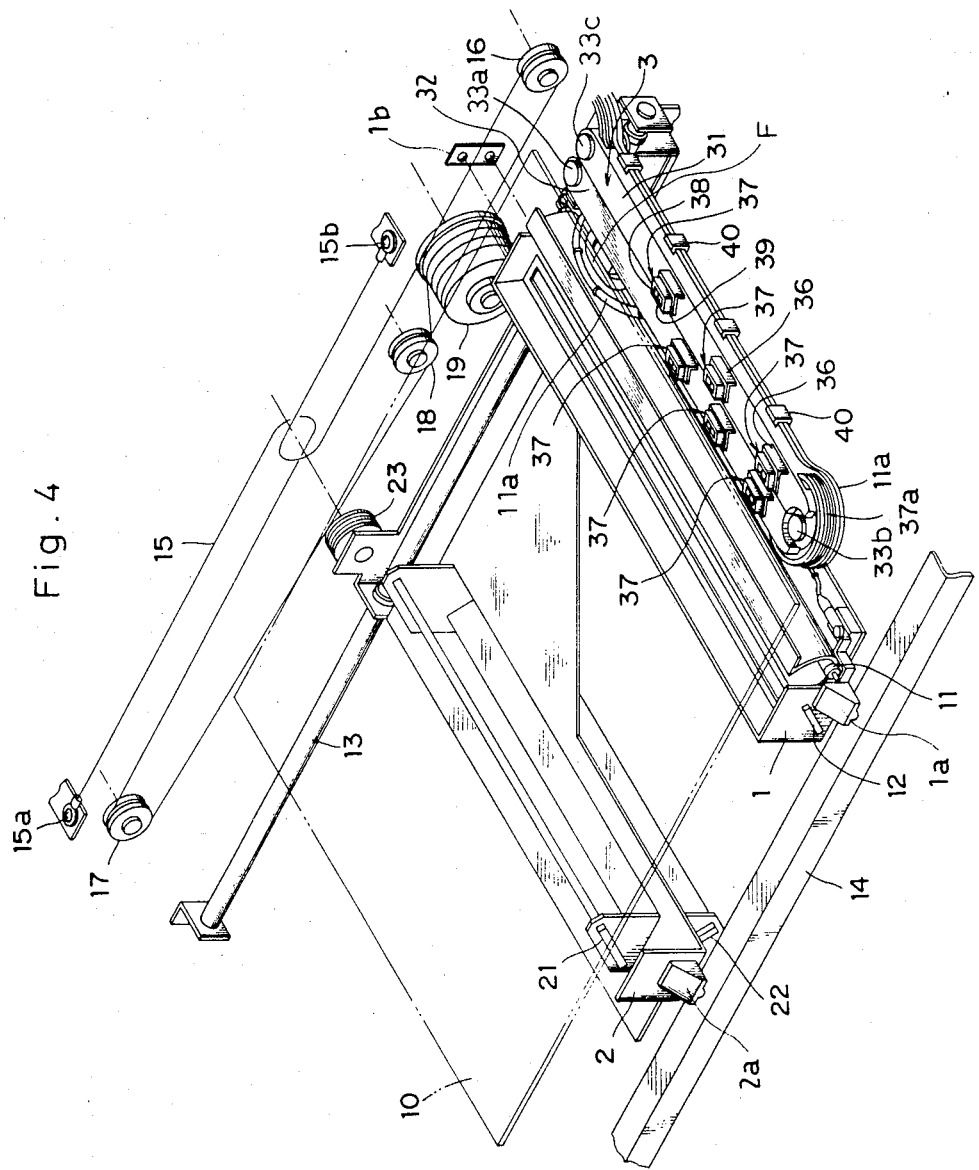
FIG. 4 is a perspective diagram illustrating a condition in which the moving frame is moved.
Figure 5:
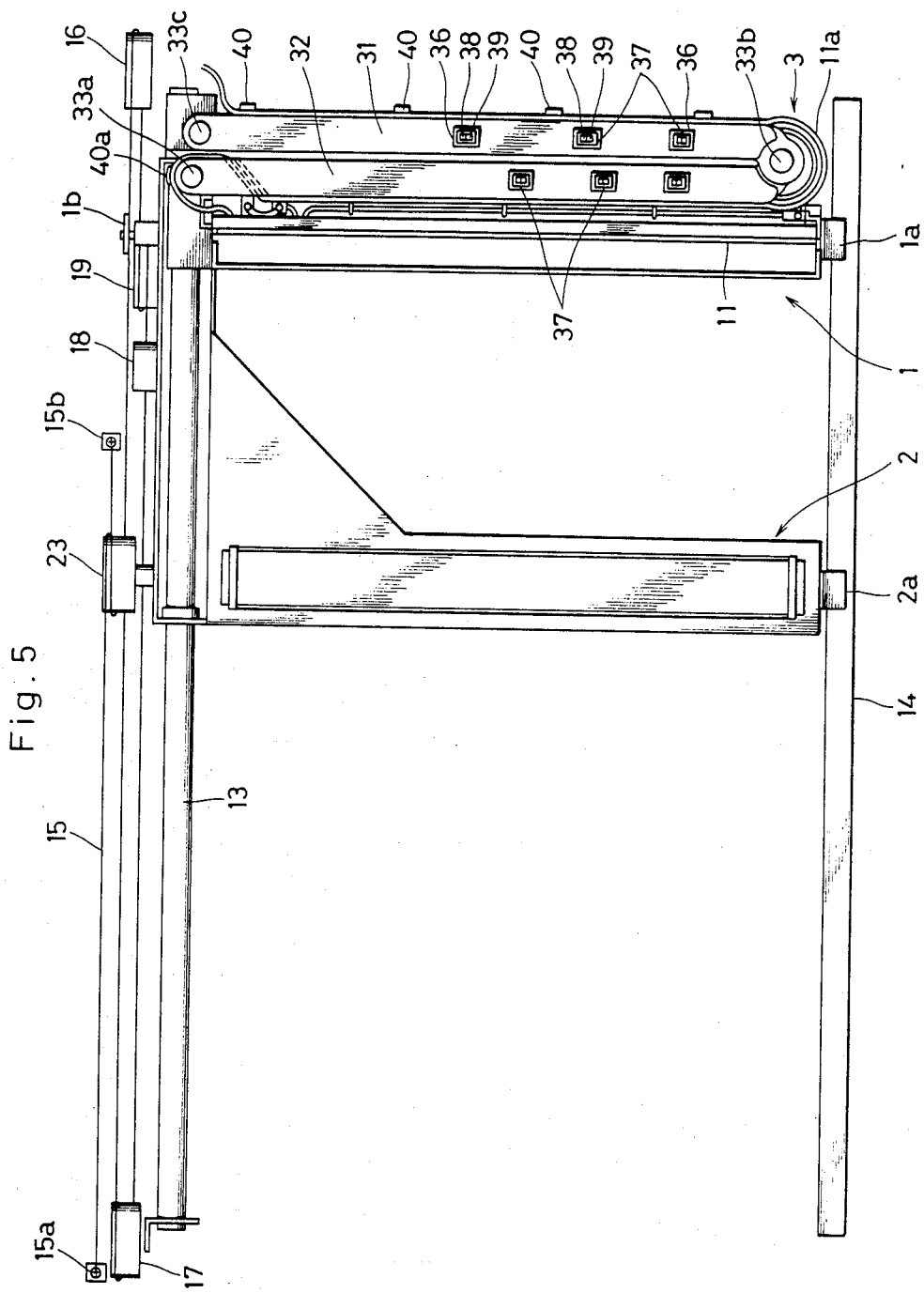
FIG. 5 is a plan view of the moving frame shown in FIG. 4.

Thereafter, by moving the two moving frames 1 and 2 to the positions shown in FIG. 4 and FIG. 5, the original document can be exposed. In this case, because the arm 3 folds by following the moving operation of the first moving frame 1, the movement of the first moving frame 1 cannot be hindered. Further, when the two moving frames 1 and 2 return back, the returning motion of the first moving frame 1 will not be hindered either because the arm 3 extends into the opposite direction of the foregoing.

Furthermore, because the feeder line 11a for the light source 11 is supported by utilizing the hook 40 of the arm 3, a special mechanism for holding the feeder line 11a is not necessary thereby simplifying the construction and reducing excess space inside the electrophotographic copying apparatus.

Because the feeder line 11a is provided with an allowance in length necessary for the rod 32 to be folded and wound round the side which is opposite to the side where the first moving frame 1 and the rod 32 face each other (the side shown by the symbol B in FIG. 2) at the portion where the foregoing arm 3 is foldably connected with respect to the first moving frame 1, it is possible to provide a large radius of the bend of the feeder line 11a, and when the foregoing arm 3 performs extending and contracting movements, it is possible to restrict strong stress from applying locally to the feeder line 11a and to prevent the cutting of the feeder line 11a.

Still furthermore, because the optical sensor 37 is installed to direct diagonally upward and there is no possibility that the optical sensor is influenced directly by the reflected light coming from the transparent plate 10, the optical sensor will not detect incorrect size of the original document but is capable of detecting the correct size of the original document.

Figure 9:
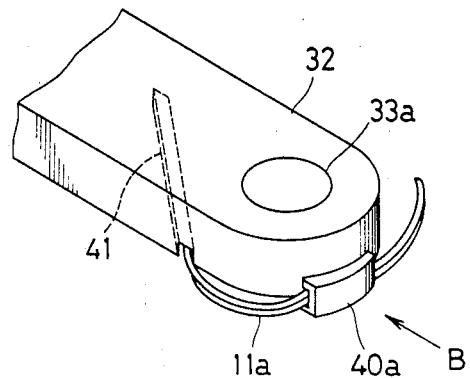
FIG. 9 is a perspective diagram illustrating a mounting section of an end of the arm close to the light source thereof.
Figure 10:
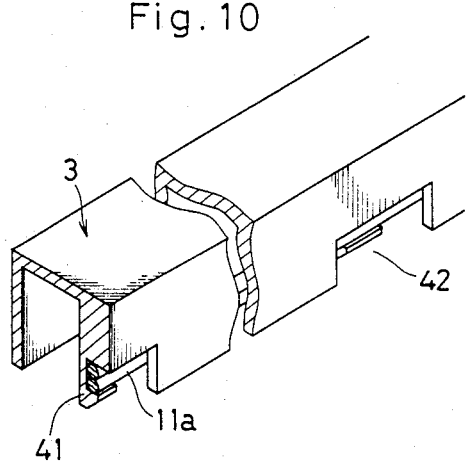
FIG. 10 is a perspective diagram of essential parts illustrating another embodiment shown in FIG. 8.
Figure 11:
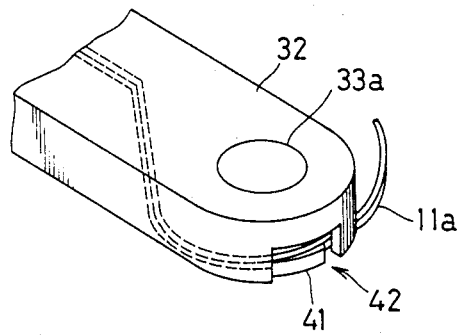
FIG. 11 is a perspective diagram illustrating other embodiments of mounting sections of an end of the arm close to the light source thereof.

It should be noted that the method to fix the feeder line 11a of the arm 3 shall not be limited to that of the foregoing embodiment. For example, FIG. 9 is a perspective diagram which illustrates the rod 32 as seen from the direction of B at the portion where the foregoing arm 3 is connected foldably with respect to the first moving frame 1, and the feeder line 11a is engaged and installed with the rod 32 by being inserted into the hollow hook 40a formed in the rod 32.

Where the feeder line 11a is to be wired along the side walls of the rods 31 and 32, the lower part of the side walls of the rods 31 and 32 may be a double wall structure to allow the feeder line 11a to be inserted through the lower part of the side walls as shown in FIG. 10 and the hook 41 may be formed on the inside wall. In this case, it is possible to wire the feeder line 11a inside the arm 3, and it is preferable to provide at the prescribed intervals window sections 42 for hooking the feeder line 11a on the hook 41 in order to facilitate the hooking of the feeder line 11a. In addition, it is also possible to fix the feeder line 11a by using the band for wiring. If the feeder line 11a is to be wound round the supporting shaft 33a of the rod 32 at the portion where the arm 3 is connected rotatably with respect to the first moving frame 1, the lower part of the side wall of the rod 32 may be a double wall structure to allow the feeder line 11a to be inserted through the lower part of the side wall of the rod 32 as shown in FIG. 11 and the hook 41 may be formed on the inside wall and the feeder line 11a may be wired inside the arm 3. Note, however, that it is also preferable in this case to provide a window section 42 for hooking the feeder line 11a on the hook 41 in order to make the feeder line hooking easy.

Figure 12A:
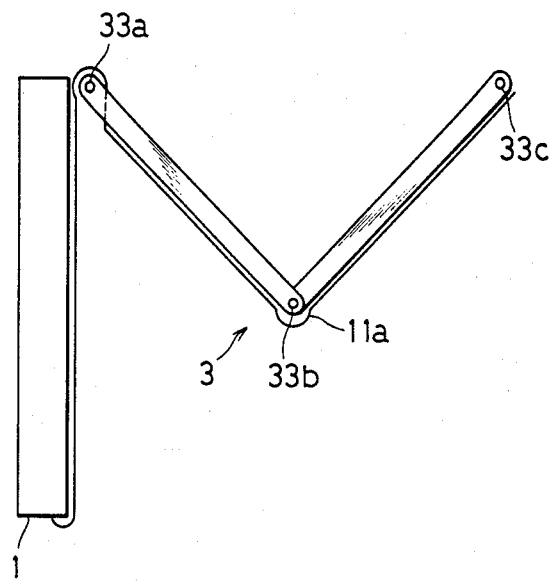
FIG. 12 is a schematic diagram illustrating conditions in which the feeder lines are installed.
Figure 12B:
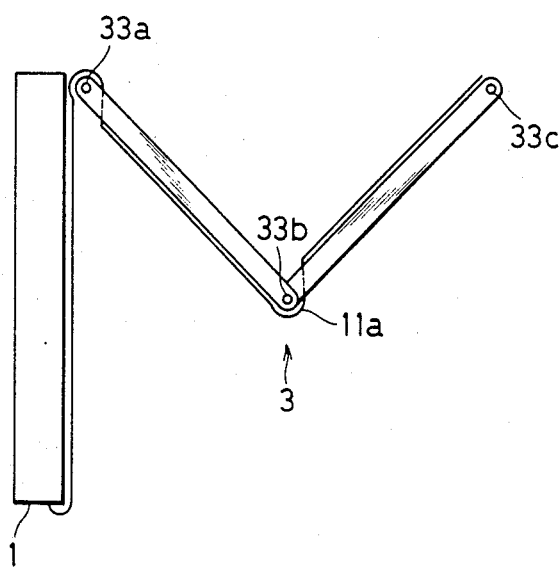

Examples of modifications will now be described with respect to the construction of the arm 3 and the installation of the feeder line. The bent section of the arm 3 is not necessarily be provided only at one location at the center of the arm 3, but the number and set position of the bent section can vary depending on at what end of the first moving frame 1 the end of the arm 3 is to be installed and at what position of the body of the electrophotographic copying apparatus the end of the arm 3 is to be installed. For example, FIG. 12(a)

through (f) denote schematic diagrams showing the construction of the arm 3 and the installation of the feeder line 11a. FIG. 12(a) and (b) respectively denote examples wherein the arm 3 has three supporting shafts 33a through 33c, and the feeder line 11a is arranged on the opposite side of the side where the rod and the moving frame or the rods face each other, with respect to the supporting shafts 33a and 33b. In this case, the feeder line 11a may be arranged at either side of the arm with respect to the supporting shaft 33c which is connected to the body of the electrophotographic copying apparatus. FIG. 12(a) and FIG. 12(b) represent examples wherein the feeder line is arranged on the opposite side respectively. As stated above, in many cases a power unit is provided right close to the supporting shaft 33c to permit the feeder line 11a to be wired either on the inside or outside of the arm 3 with respect to the supporting shaft 33c, because the feeder line 11a connected to this power unit does not fold as does the feeder line 11a provided at other bent portion thereof.

Figure 12C:
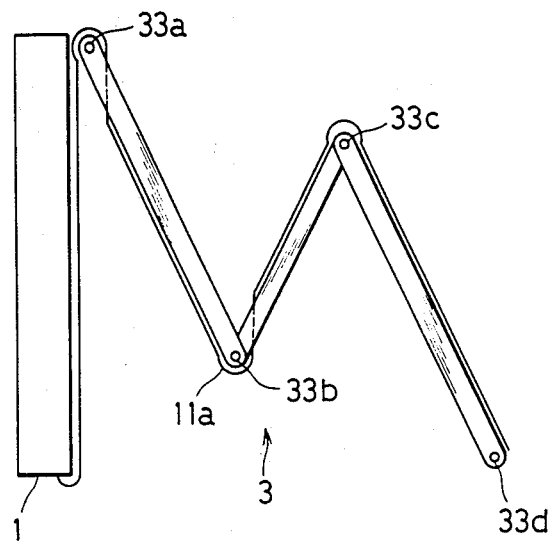
Figure 12D:
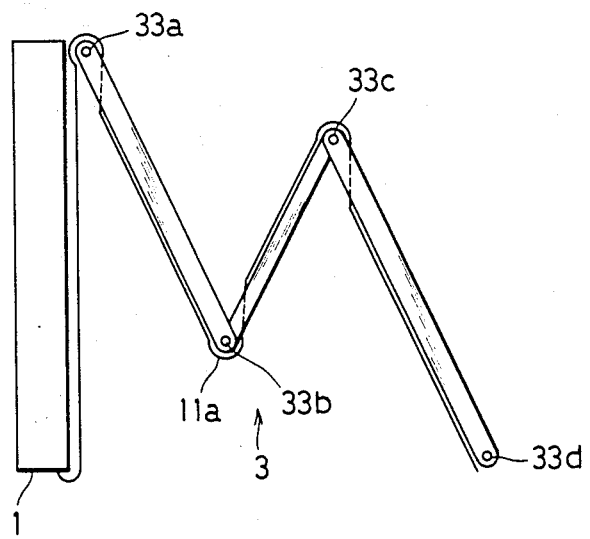

FIG. 12(c) and FIG. 12(d) are examples of the arm 3 having four supporting shafts 33a through 33d, in which the arm 3 is connected to the other position of the body of the electrophotographic copying apparatus with respect to the supporting shaft 33d. With respect to the supporting shafts 33a through 33c, the feeder line 11a is arranged at the opposite side of the side where the rod and the moving frame or the rods face each other. With respect to the supporting shaft 33d which is connected to the body of the electrophotographic copying apparatus, it is the same as the foregoing examples shown in FIG. 12(a) and FIG. 12(b) that the feeder line 11a may be provided either on the inside or the outside of the portion where the feeder line 11a is folded.

Figure 12E:
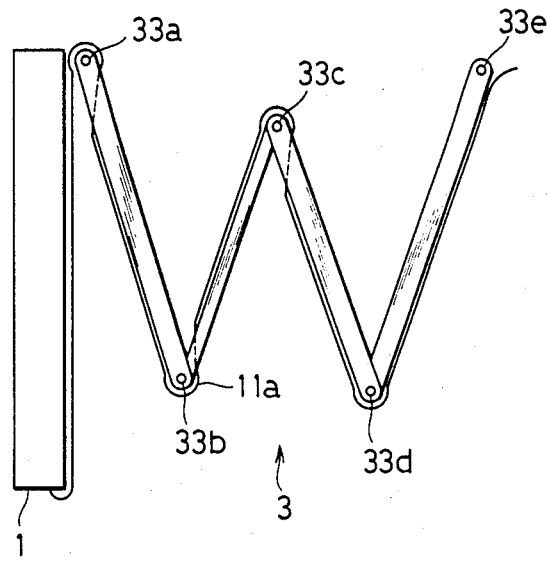
Figure 12F:
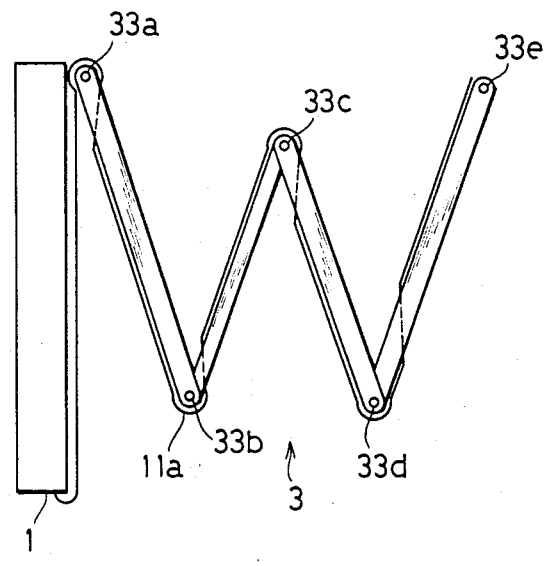

FIG. 12(e) and FIG. 12(f) represent examples of the arm 3 having five supporting shafts 33a through 33e, wherein with respect to the supporting shafts 33a through 33d the feeder line 11a is wired on the opposite side of the side where the rod and the moving frame or the rods face each other. With respect to the supporting shaft 33e which is connected to the body of the electrophotographic copying apparatus, the feeder line 11a may be provided either on the inside or the outside of the arm.

Now, by referring to FIG. 13 through FIG. 17, other embodiments of the document size detecting device will be described. The document size detecting device of these embodiments has at a prescribed position of the arm 3 a board 35 which is equipped with the optical sensor 37 and the processing circuit which processes the output signal coming from the optical sensor 37.

Generally, in an electrophotographic copying apparatus, where the optical sensor 37 is used to detect the document size, it is possible to detect the document size quickly and accurately but the level of the signal which can be obtained by the optical sensor 37 is normally in a range from several $\mu A$ to about 1 mA and this signal being an analog signal, and it requires a fairly long lead wire for leading the analog signal to the control section. Therefore, such signal is susceptible to the noise generated by a motor, influence of other lead wires, influence of the feeder line connected to the light source, and influence of noise caused externally for example. By being subjected to such influences as above, a signal which largely varies from the true signal for detecting an original document will be supplied to the control section and there is a good possibility of lowering the detection accuracy of the original document.

For the purpose of eliminating inconveniences such as above and to provide a document size detecting device which is capable of acurately detecting the document size without being possible affected the noise from external parts of an electrophotographic copying apparatus or from inside parts thereof, the optical sensor 37 and the processing circuit for processing the output signal from the optical sensor 37 are provided on the same board 35 and this board 35 is contained in the arm 3.

Figure 13:
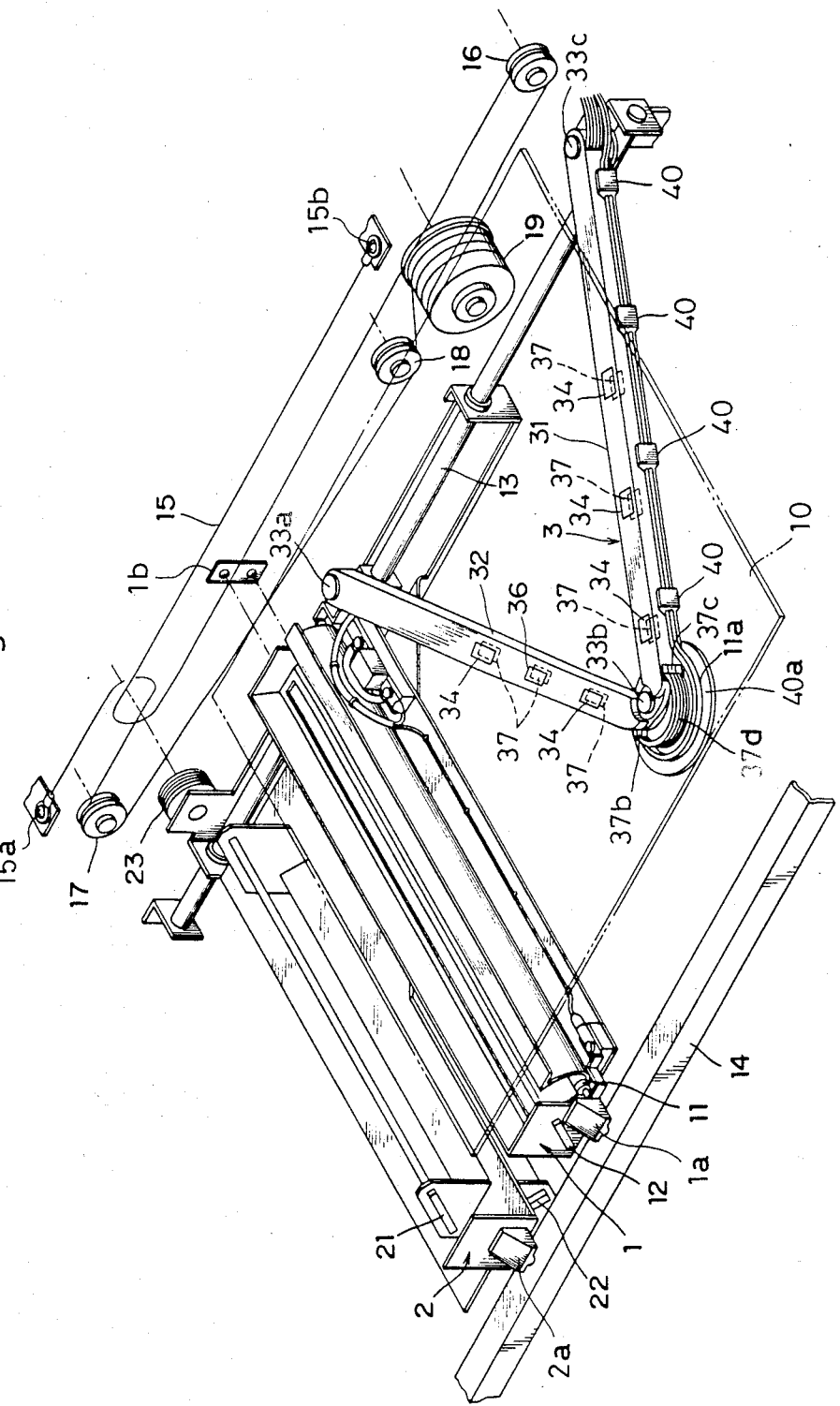
FIG. 13 is a perspective diagram illustrating other embodiment of a document size detecting device according to the present invention.
Figure 14:
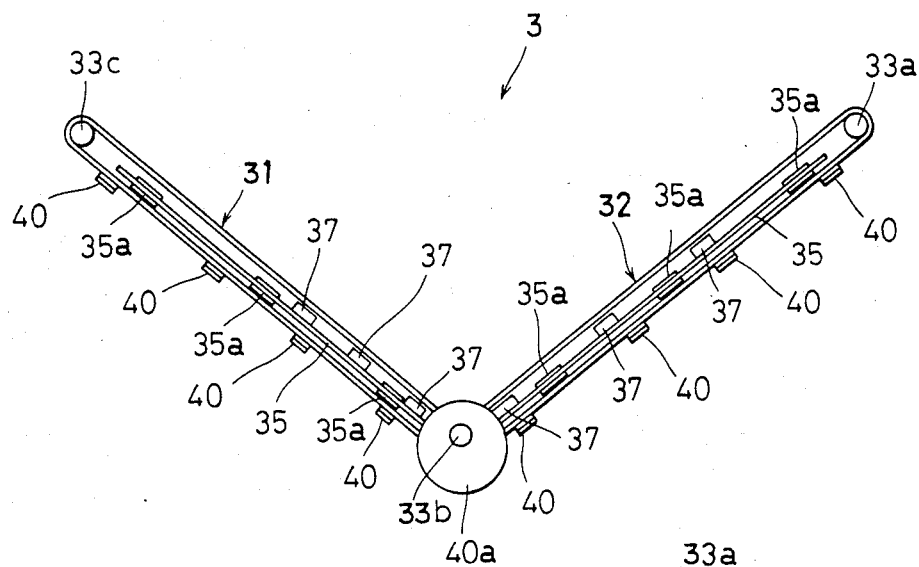
FIG. 14 is a diagram of the bottom of the arm in an embodiment shown in FIG. 13.
Figure 15:
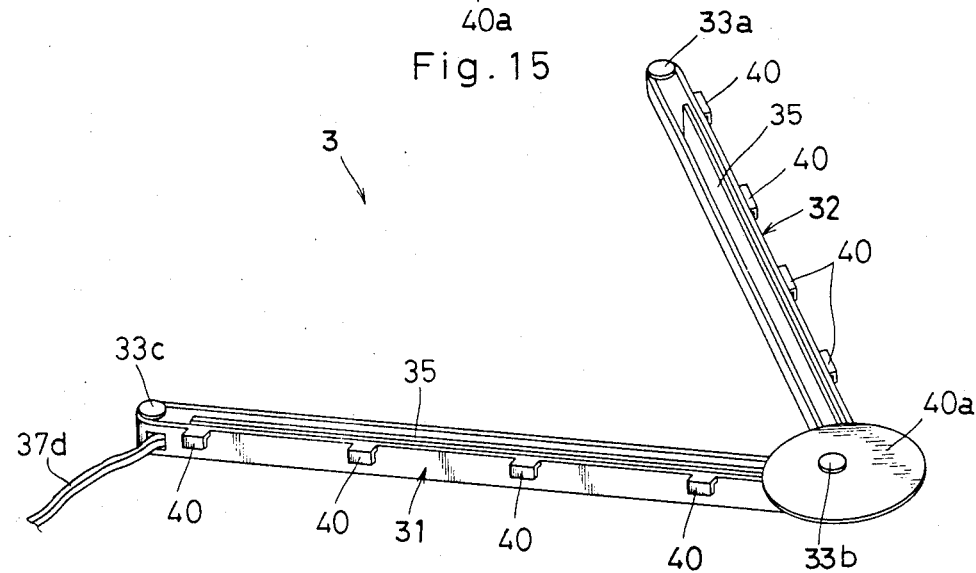
FIG. 15 is a perspective diagram of the bottom of the foregoing arm.

To describe it more particularly, both rods 31 and 32 constituting the arm 3 are formed at the prescribed positions thereon with the window 34 for the optical sensor 37 as shown in FIG. 13. At the prescribed positions in the internal spaces of both rods 31 and 32 are provided holders 35a for holding the board 35 as shown in FIG. 14 and FIG. 15. Further, by this holder 35a, the board 35 mounted with the processing circuit element (not shown) is detachably held and the optical sensor 37 is installed in front of each of the window 34 at the prescribed position of the board 35.

Figure 16:
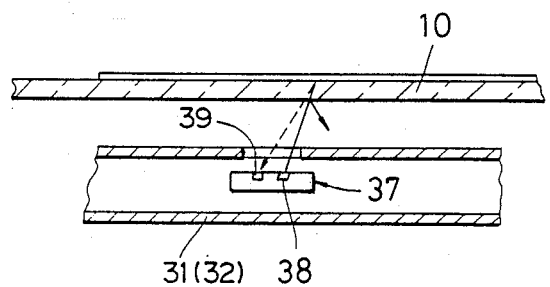
FIG. 16 is a sectional view of essential parts describing the detecting action of the optical sensor.

As shown in the schematic diagram of FIG. 16, the foregoing optical sensor 37 is installed integrally with the photo emitter 38 and the photo receptor 39 by causing them to be mutually close to each other. The emitting direction of the light irradiated from the photo emitter 38 is not toward straightly upward of the optical sensor 37, but is set toward the opposite direction of the photo receptor 39, that is, the direction away from the photo receptor 39 by using a lens or the like or by tilting only the element of the photo emitter 38. By adopting the foregoing structure, it becomes possible to detect the presence of an original document by causing the scattered light from the original document set on the transparent plate 10 to be received by the photo receptor. In this case, it is possible to cause the light reflecting from the bottom surface of the transparent plate 10 not to directly enter the photo receptor without installing the whole optical sensor 37 being inclined while it is possible to neatly contain the optical sensor 37 inside of each rod 31 and 32.

Connectors 37b and 37c are provided at the prescribed location of the board 35 which is close to the supporting shaft 33b of both rods 31 and 32 (refer to FIG. 13) and the lead wire 37d which is caused to be curved like a loop between the connectors 37b and 37c is connected to these connectors 37b and 37c, thereby making it easy to replace the lead wire 37d should it be broken.

Furthermore, a supporting plate 40a which prevents hanging of the lead wire 37d and the feed line 11a is securely installed with respect to the shaft 33b. Therefore, it is positively prevented by the supporting plate 40a that the lead wire 37d and the feed line 11a hang and come in contact to be abraded, so that it is possible to prevent the optical system from vibrating due to unnecessary force applied thereto.

Figure 17:
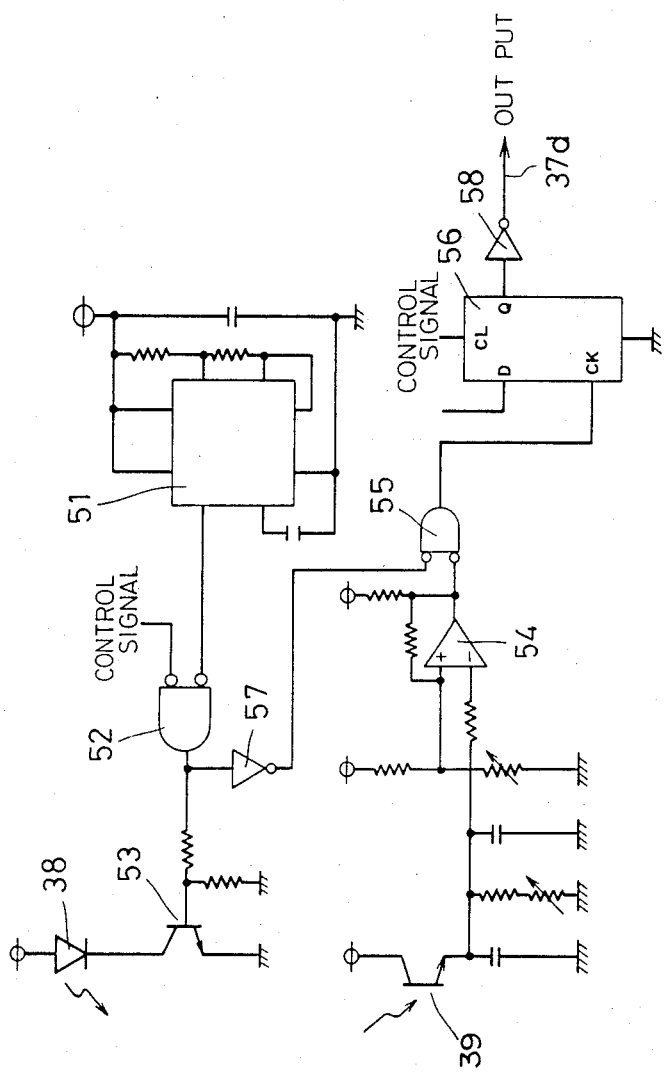
FIG. 17 is an electrical circuit diagram illustrating an electrical structure for detecting the document size.

FIG. 17 is an electric circuit diagram illustrating the condition of electrical connections of the optical sensor 37 and processing circuit element mounted on the board 35. An oscillation signal from the oscillator 51 is supplied to the base terminal of the switching transistor 53 for controlling the power supplied to the photo emitter 38 through the gate 52 for controlling the oscillation signal coming from the oscillator 51. On the other hand, the signal to control lighting of the photo emitter is supplied from the control section (not shown) to the gate 52 for control. The output signal from the foregoing photo receptor 39 is smoothed by the capacitor and supplied to the comparator 54 and the output signal from the comparator 54 is supplied to the gate 55. At the same time, the signal issued from the gate 52 for control is caused to be inverted by the inverter 57 and input into the gate 55. The output signal of the gate 55 is supplied to the clock input terminal CK of the D flip flop 56 and the Q output signal of the D flip flop is inverted by the inverter 58 and supplied to the control section.

According to the electric circuit of the foregoing, power is supplied to the photo emitter 38 through the switching transistor 53 which the gate 52 for control is being opened according to the signal which is supplied from the control section and used for controlling the lighting of the photo emitter. Further, the signal generated from the photo receptor 39 which receives the irradiated light of the photo emitter 38 is smoothed and supplied to the comparator 54 and the signal of high level or low level is issued from the comparator 54. And further, this signal is supplied to the clock input terminal CK of the D flip flop 56 through the gate 55 which is opened at the same timing of the gate 52. When this signal is supplied to the clock input terminal CK of the D flip flop 56, the D flip flop is reset. Therefore, the Q output signal becomes high level only when the output signal from the comparator 54 is high level, and in the reverse case, the Q output signal is held at low level.

Because the foregoing circuit structure is provided for each optical sensor 37, some output signals become high level and other output signals become low level corresponding to the size of the original document set on the transparent plate (providing that all the output signals may become high level or low level in some condition). Therefore, it is possible to accurately detect the document size in accordance with the combination of the output signals.

In a document size detecting device of the foregoing structure, signals are outputted from the optical sensor 37 at a prescribed timing and are supplied to the processing circuit mounted on the substrate without being affected by noise. In the processing circuit, it is possible to convert the signal from the optical sensor 37 into the signal whose contents are not changed even under the influence of noise and to supply such signal to the control section inside the electrophotographic copying apparatus, thereby causing accurate detection of original document to be accomplished.

Furthermore, because the foregoing optical sensor 37 is integrally installed with respect to the board 35, it is possible to simplify the installation of the optical sensor 37 and the board 35 on the arm 3.

Because the foregoing board 35 is detachably installed with respect to the rods 31 and 32, it is possible to replace the board 35 easily.

Figure 18:
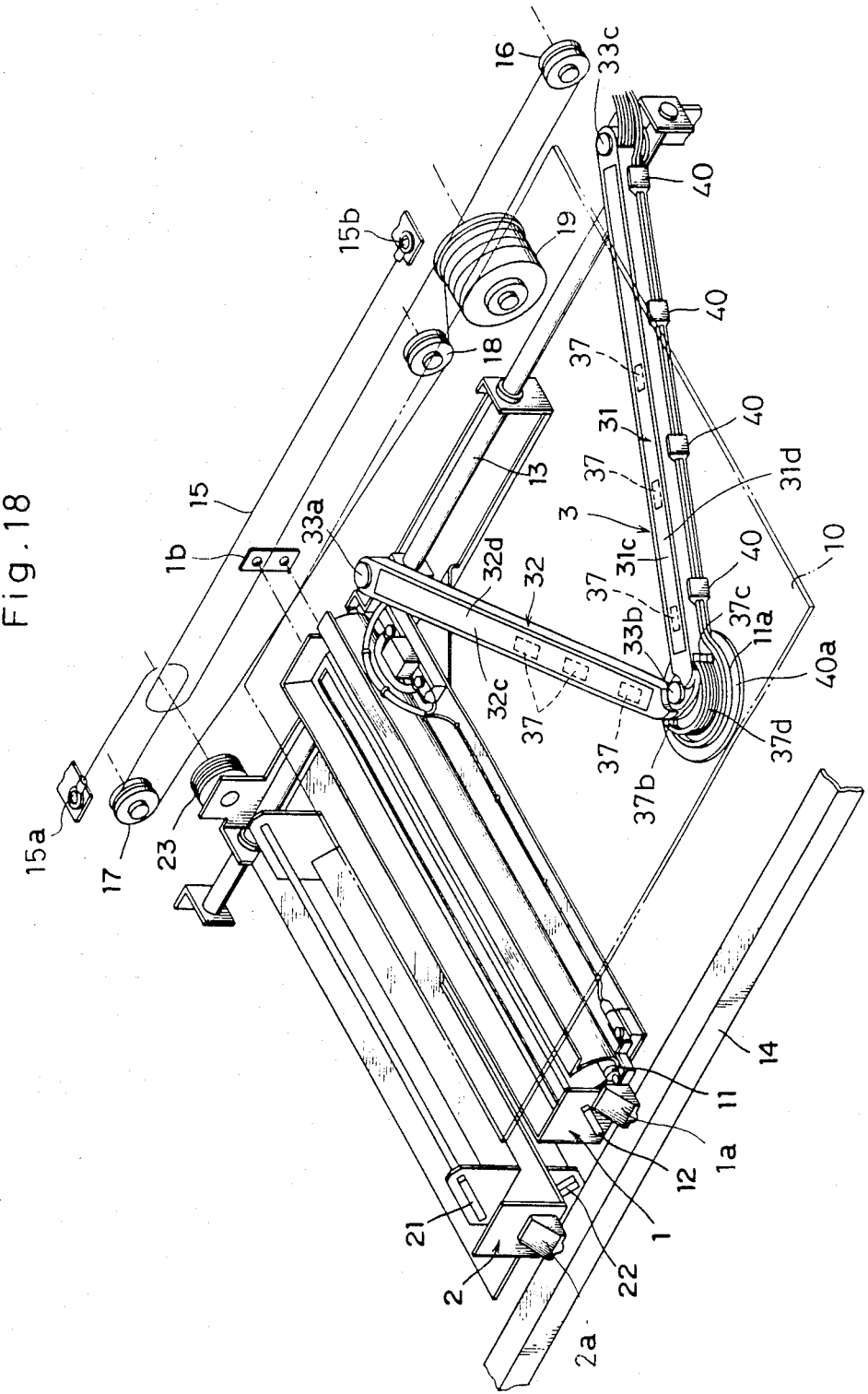
FIG. 18 is a perspective diagram illustrating an example of changed version of the embodiment shown in FIG. 13.

FIG. 18 is a perspective diagram illustrating other embodiment and is only different from the embodiment shown in FIG. 13 in that large openings 31c and 32c are formed almost the entire length of the tops surfaces of both rods 31 and 32, that filters 31d and 32d for covering such openings 31c and 32c, and that the substrate 35 is slidably installed with respect to the rods 31 and 32.

By providing the filters 31d and 32d, it is possible to cause only the light of a specific wavelength to be transmitted or to reject the light of a specific wavelength. For example, if a visible light removing filter is installed, it is possible to reject the influence of visible light entering from outside.

Also, by providing the board 35 slidably, it is possible to change the position of the optical sensor 37 easily by sliding the board 35. Therefore, it is possible to easily adjust the position to install the optical sensor 37 according to the document size and also to easily adjust any small position deviation of the optical sensor 37. If in case the installation position of the optical sensor 37 differs largely and it is impossible to make positional adjustment merely by sliding the board 35, the positional adjustment of the optical sensor 37 can be accomplished by removing or mounting the board 35. As a result of this, the position of the optical sensor can be accurately established even if installation errors exist of the optical element.

In the embodiment shown in FIG. 18, it is also possible to form the rods 31 and 32 and the supporting members of the optical sensor 37 using the same materials of the filters 31d and 32d, and if such a construction is employed, it will not be possible any more to adjust the installation position of the optical sensor 37 in a manner stated above. It is possible, however, to integrally form the rods 31 and 32, supporting members, and the filters 31d and 32d and to accurately establish the installation position of the optical sensor 37 beforehand.

Figure 19:
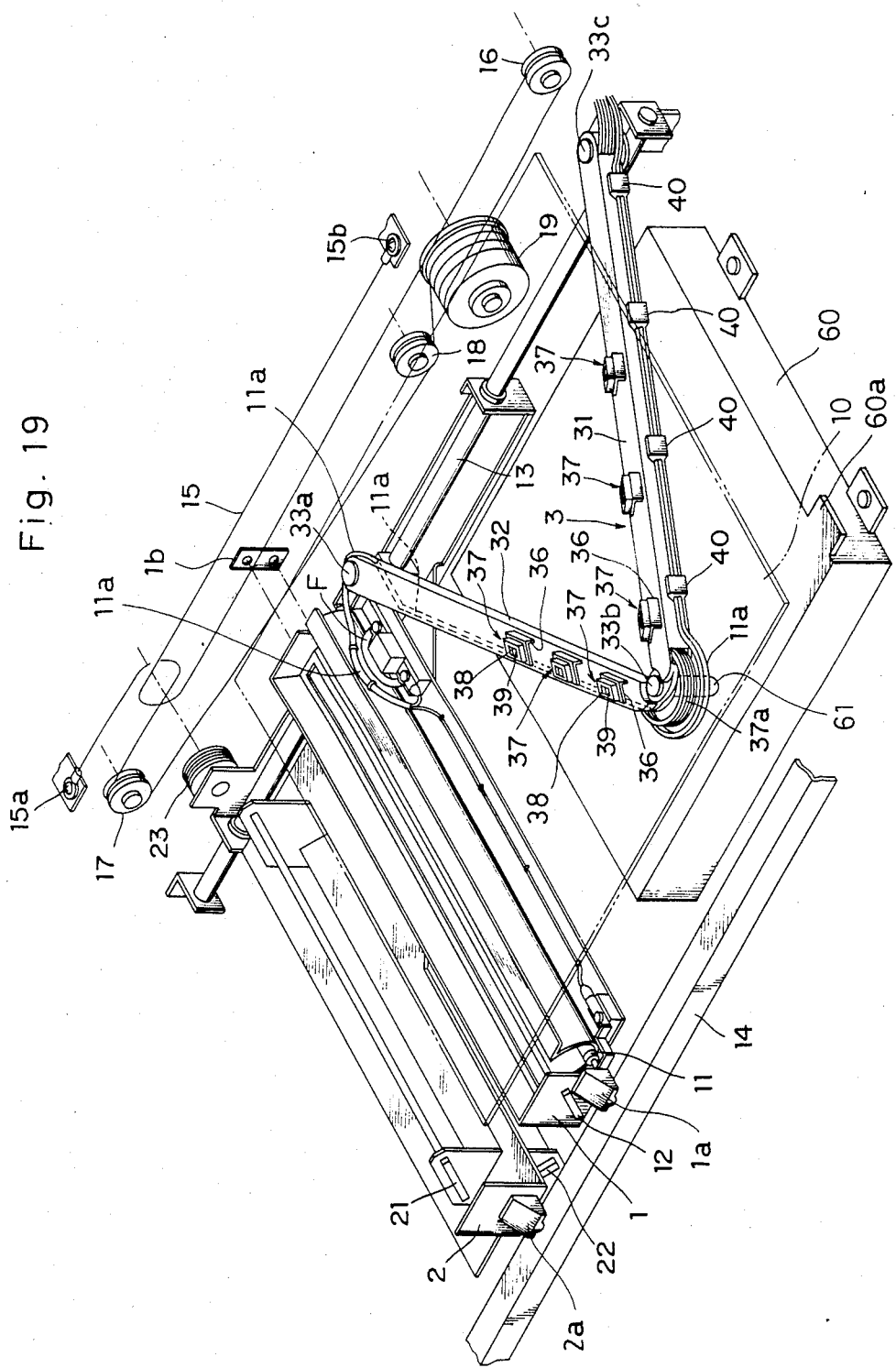
FIG. 19 is a perspective diagram illustrating an embodiment of a document size detecting device in which the downward movement of the arm due to the gravity thereof is prevented.
Figure 20:
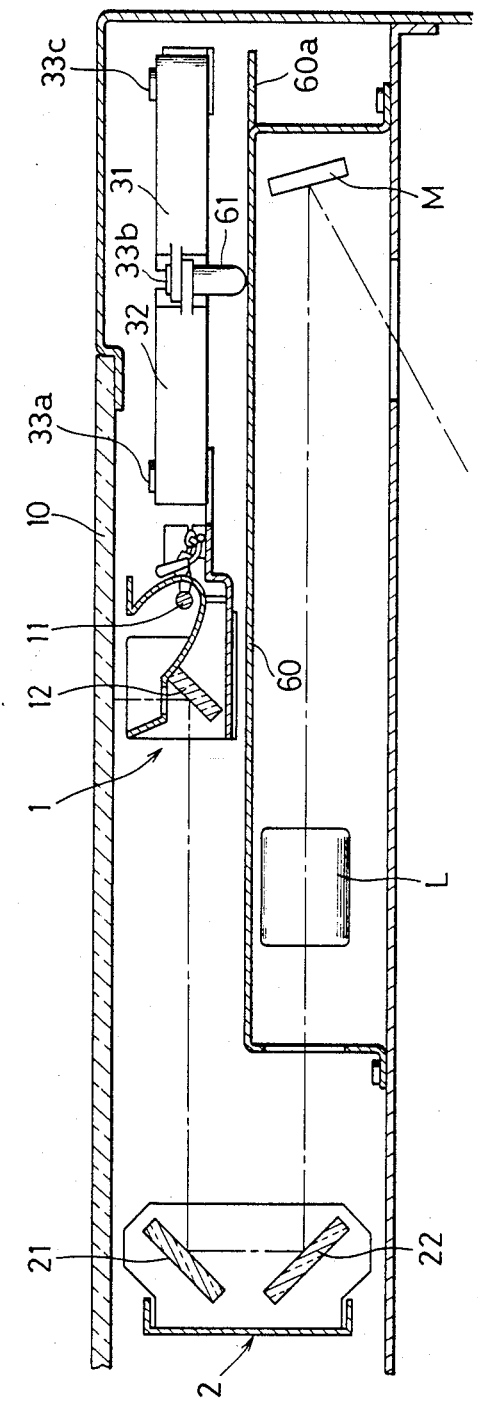
FIG. 20 is a sectional view of the embodiment shown in FIG. 19.

FIG. 19 is a perspective diagram of an embodiment of a document size detecting device wherein the arm 3 is prevented from moving downward by its own weight. In the document size detecting device shown in FIG. 19, a supporting member 60 is provided which has a substantially parallel plane with respect to the surface where an original document is placed. To be concrete, the supporting shaft 33b for folding the arm 3 is extended lengthily and vertically downward as shown in FIG. 19 thereby causing the lower end 61 of the supporting shaft 33b to freely slidably contact the supporting member 60. As shown in FIG. 20, the supporting member 60 is also used as a housing which contains the lens L for collecting the light coming from the reflecting mirror 22 of the second moving frame 2 and the reflecting mirror M which causes to reflects the light collected by the lens L and to expose the light on the prescribed surface of the photosensitive body (not shown). In addition, if the supporting member 60 is small, the protruding portion 60a on the top surface of the supporting member 60 is provided to secure the contacting surface between the lower end 61 of the supporting shaft 33b and the supporting member 60.

According to the foregoing structure, because the lower end 61 of the supporting shaft 33b slides while contacting the supporting member 60 on a point, the arm 3 will be supported almost equally by the supporting shafts 33a, 33b and 33c. By this structure, it becomes possible to prevent the arm 3 from hanging and to dispose the optical sensor 37 substantially parallel with respect to the surface where an original document is placed. Therefore, it is possible to detect the document size with closer accuracy. Moreover, because unnecessary load is not applied to the connected portion 33a with respect to the first moving frame 1, it is possible to prevent vibration from generating when the arm 3 accomplishes folding movement. Therefore, it becomes possible to smoothly reciprocate the optical system.

Figure 21:
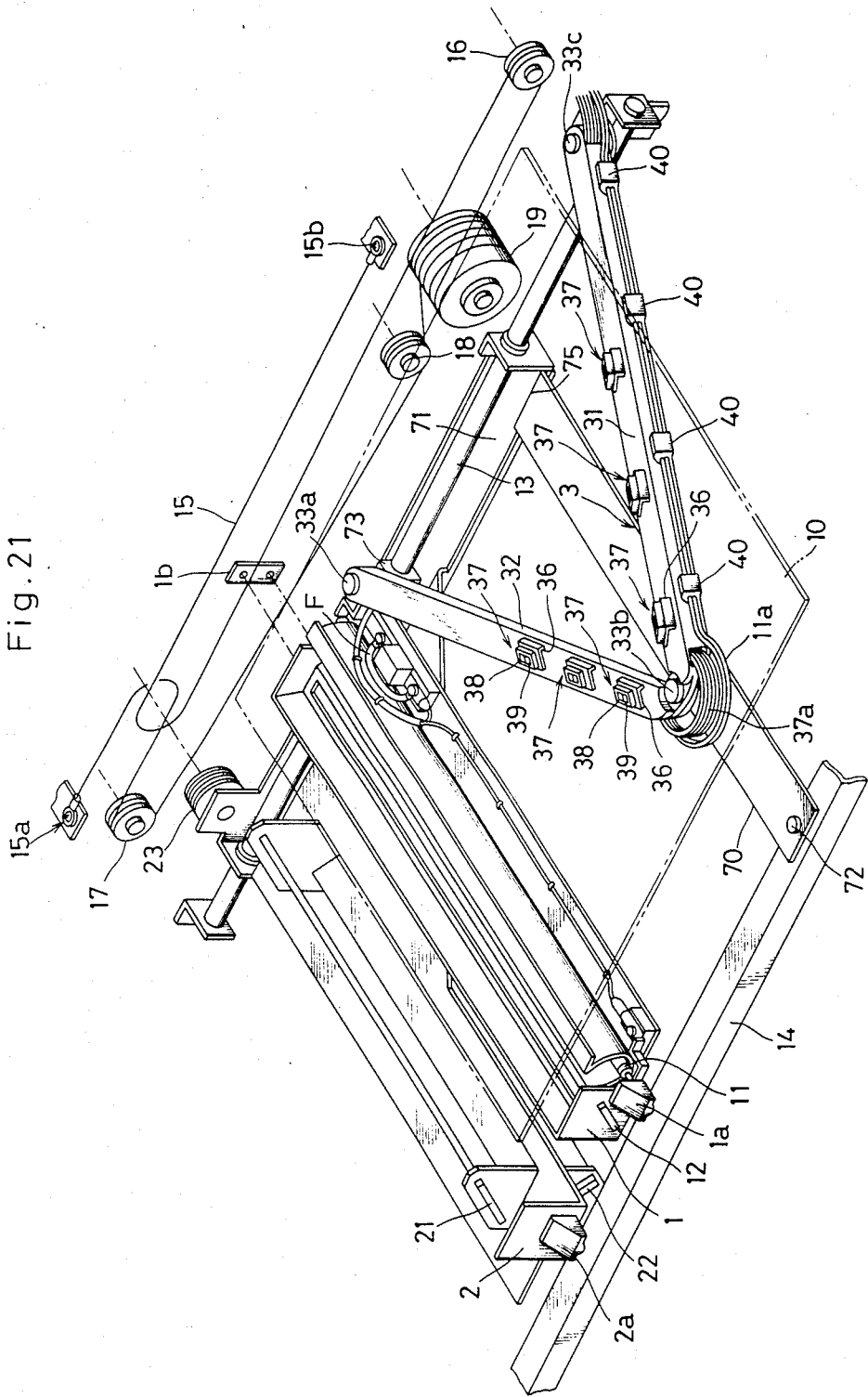
FIG. 21 is a perspective diagram illustrating other embodiment in which the downward movement of the arm due to the gravity thereof is prevented.
Figure 22:
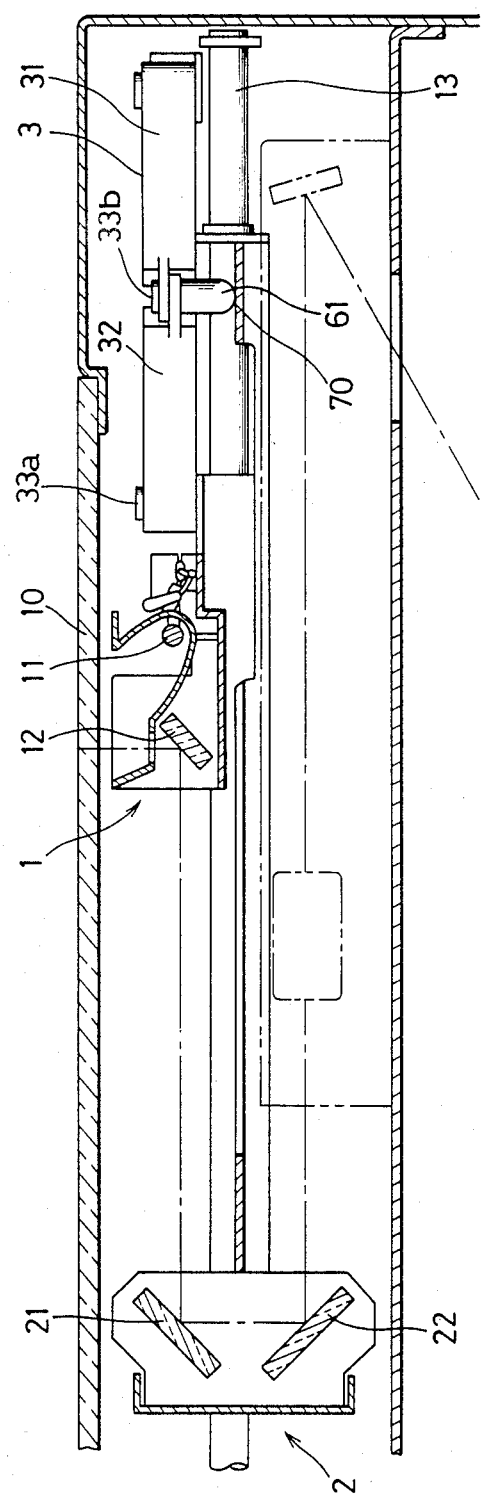
FIG. 22 is a sectional view of the embodiment shown in FIG. 21.

FIG. 21 is a perspective diagram illustrating other embodiment of a document size detecting device in which the arm 3 is prevented from moving downward by the weight thereof, and FIG. 22 is a sectional side elevation. In this embodiment, instead of the flat supporting member 60 shown in the embodiment of FIG.

19, a narrow width rectangular supporting member 70 is used to cause to interlock the movement of the supporting member 70 with the movement of the second moving frame 2. In other words, an end plate 71 which slides along the guide shaft 13 is provided on the end portion where the driven pully 23 of the second moving frame is installed as shown in FIG. 21. At the tip of this end plate 71 (where the arm 3 is) is fixed one end 75 of the foregoing rectangular supporting member 70, and te other end of the supporting member 70 is caused to contact the guide rail 14 by means of the slider 72. As has already been described, the moving speed of the second moving frame 2 is half the moving speed of the first moving frame 1. Because the moving speed of the bent portion of the arm 3 is also the half the moving speed of the first moving frame 1, the moving speed of the bent portion of the arm 3 is equal to the moving speed of the second moving frame 2. Therefore, in the foregoing constitution, because it is possible for the supporting shaft 33b of the arm 3 to always contact the top surface of the supporting member 70 without coming off from the supporting member 70 even if the arm 3 performs folding motion, the arm 3 is supported almost equally by the three shafts 33a, 33b, and 33c thereby making it possible to accomplish accurate detection of the document size. Furthermore, this embodiment is different from the embodiment shown in FIG. 19 where the supporting member 70 can be a rectangular plate of narrow width, so that this embodiment has an advantage of saving material and reducing overall weight thereof.

The document size detecting device according to the present invention has been described in detail according to respective embodiments thereof and by referring to the attached drawings, however, it shall not be construed that the present invention is limited to embodiments of above. For example, it is also possible to install only one optical sensor 37 to detect only the presence of an original document. Besides, not only for the analog optical system used to lead the reflected light from an original document to a photosensitive body as it is, but the document size detecting device of the present invention may be adopted for the image scanner which is used to convert the reflected light from an original document into digital signal. It is to be understood that various changes may be provided to the present invention without departing from the spirit and scope thereof.

As has been described above, in a document size detecting device of the present invention, because it is not necessary to install a special driving mechanism for detecting the document size, the document size detection device can be installed easily on an image forming apparatus of optical system moving type without being influenced by the speed to close the original document presser and it is further possible to reduce the time from a point where the key operation is accomplished for starting the exposure of an original document to a point where the exposure of the original document is completed. Furthermore, because the feeder line for the light source is held by the arm, a special mechanism used to hold said feeder line is not necessary and it becomes possible to simplify the construction and reduce the size of the image forming apparatus.

Because the feeder line is caused to curve along the outside of the arm at respective rotating parts thereof, it is possible to provide a large radius of the bent portion of the feeder line thereby to prevent considerably concentrated stress from locally applying to the feeder line, extend the life of the feeder line, and realize smooth movement of the optical system.

What is claimed is:

1. A document size detecting device equipped in an image forming apparatus of optical system moving type for scanning and exposing an original document by reciprocating the optical system, wherein an arm foldable at least at one location is installed, one end of the arm is rotatably connected to a prescribed position of the body of the image forming apparatus, the other end of the arm is rotatably connected to a prescribed position of a moving frame which supports an optical element so as to be extended and contracted by interlocking with the movement of the optical system, one or more optical sensor is installed on the top surface of the arm, and a feeder line for supplying power to a light source provided on the optical system to illuminate the original document is installed along the arm.

2. A document size detecting device according to claim 1, wherein a plurality of optical sensors are provided at positions where original documents of various sizes used can be discriminated from original documents of other sizes.

3. A document size detecting device according to claim 1, wherein the optical sensor comprises a photo receptor and a photo emitter and is installed on the arm so that the whole optical sensor is directed diagonally upward.

4. A document size detecting device according to claim 1, wherein the optical sensor comprises a photo receptor and a photo emitter and the direction of irradiation of the photo emitter is established diagonally.

5. A document size detecting device according to claim 1, wherein a mounting section for installing the feeder line is integrally provided with the arm.

6. A document size detecting device according to claim 1, wherein the feeder line for supplying power to a light source provided on the optical system to illuminate the original document is installed along the approximately entire length of the arm.

7. A document size detecting device according to claim 1, wherein the feeder line for supplying power to a light source provided on the optical system to illuminate the original document is installed along the entire length of the arm.

8. A document size detecting device according to claim 1, at a prescribed position of the arm is provided a board mounted with a processing circuit used to process an output signal from the optical sensor.

9. A document size detecting device according to claim 8, wherein the optical sensor is integrally installed with respect to the board.

10. A document size detecting device according to claim 8, wherein the board is installed detachably with respect to the arm.

11. A document size detecting device according to claim 8, wherein the board is installed slidably with respect to the arm.

12. A document size detecting device equipped in an image forming apparatus of the optical system moving type for scanning and exposing an original document by reciprocating the optical system, wherein an arm foldable at least at one intermediate section is installed so as to be extended and contracted by interlocking with the movement of the optical system, one end of the arm is rotatably connected to a prescribed position of the body of the image forming apparatus, the other end of the arm is rotatably connected to a prescribed position of a moving frame which supports an optical element, one or more optical sensor is installed on the top surface of the arm, a feeder line for a light source is installed along the arm, and the feeder line is caused to curve along the outside of the arm at respective rotating sections except for one end of the arm connected to the body of the image forming apparatus.

13. A document size detecting device according to claim 12, wherein a plurality of optical sensors are provided at positions where original documents of various sizes used can be discriminated from original documents 14. A document size detecting device according to claim 12, wherein the optical sensor comprises a photo receptor and a photo emitter and is installed on the arm so that the whole optical sensor is directed diagonally upward.

15. A document size detecting device according to claim 12, wherein the optical sensor comprises a photo receptor and a photo emitter and the direction of irradiation of the photo emitter is established diagonally.

16. A document size detecting device according to claim 12, wherein a mounting section for installing the feeder line is integrelly installed with the arm.

17. A document size detecting device according to claim 12, at a prescribed position of the arm is provided a board mounted with a processing circuit used to process an output signal from the optical sensor.

18. A document size detecting device according to claim 17, wherein the optical sensor is integrally installed with respect to the board.

19. A document size detecting device according to claim 17, wherein the board is detachably installed with respect to the arm.

20. A document size detecting device according to claim 17, wherein the board is slidably installed with respect to the arm.

* * * * *

UNITED STATES PATENT AND TRADEMARK OFFICE
CERTIFICATE OF CORRECTION

PATENT NO. : 4,814,833
DATED : March 21, 1989
INVENTOR(S) : Tetsuya Matsushita et al It is certified that error appears in the above-identified patent and that said Letters Patent is hereby corrected as shown below:

On the cover page, the third line in the Foreign Application Priority Data beginning with "Nov. 17, 1987 [JP] Japan ... 61-273743" should read -- Nov. 17, 1986 [JP] Japan ... 61-273743-

Column 15, line 9, cancel beginning with "13. A document size detecting device" to and including "can be discriminated from original documents" in line 12, and insert the following claim:

-- 13. A document size detecting device according to claim 12, wherein a plurality of optical sensors are provided at positions where original documents of various sizes used can be discriminated from original documents of other size. --

Column 16, line 5, "integrelly" should read -- integrally --.

Signed and Sealed this

Ninth Day of January, 1990

Attest:

JEFFREY M. SAMUELS

*Attesting Officer*     *Acting Commissioner of Patents and Trademarks*